United States Patent
Gottfried et al.

(10) Patent No.: US 6,761,747 B2
(45) Date of Patent: Jul. 13, 2004

(54) DISPERSION CONTAINING PYROGENICALLY MANUFACTURED ABRASIVE PARTICLES WITH SUPERPARAMAGNETIC DOMAINS

(75) Inventors: Heiko Gottfried, Schoeneck (DE); Markus Pridoehl, Grosskrotzenburg (DE); Berthold Trageser, Freigericht (DE); Guido Zimmermann, Hanau (DE); Stefan Heberer, Gelnhausen (DE); Heike Muehlenweg, Nidderau (DE)

(73) Assignee: Degussa AG, Duesseldorf (DE)

( * ) Notice: Subject to any disclaimer, the term of this patent is extended or adjusted under 35 U.S.C. 154(b) by 0 days.

(21) Appl. No.: 10/278,846

(22) Filed: Oct. 24, 2002

(65) Prior Publication Data

US 2003/0100187 A1 May 29, 2003

(30) Foreign Application Priority Data

Oct. 30, 2001 (DE) .......................... 101 53 547

(51) Int. Cl.⁷ ............................ C09G 1/02; C09G 1/04; H01L 21/302
(52) U.S. Cl. ............................ 51/309; 51/307; 51/308; 106/3; 252/62.51 R; 252/62.56; 252/62.57; 252/62.59; 252/62.51 C; 216/89; 438/692; 438/693
(58) Field of Search .................. 51/307, 308, 309; 106/3; 252/62.51 R, 62.56, 62.57, 62.59, 62.51 C; 216/89; 438/692, 693

(56) References Cited

U.S. PATENT DOCUMENTS

| | | | | |
|---|---|---|---|---|
| 4,964,883 A | * | 10/1990 | Morris et al. .................. | 51/293 |
| 5,908,478 A | * | 6/1999 | Wood .......................... | 51/309 |
| 6,083,839 A | | 7/2000 | Wong | |
| 6,238,279 B1 | | 5/2001 | Shau et al. | |
| 6,447,563 B1 | * | 9/2002 | Mahulikar .................... | 51/309 |

FOREIGN PATENT DOCUMENTS

| | | |
|---|---|---|
| WO | WO 94/10694 | 5/1994 |
| WO | WO 00/68332 | 11/2000 |
| WO | WO 01/37291 | 5/2001 |

\* cited by examiner

*Primary Examiner*—Michael Marcheschi
(74) *Attorney, Agent, or Firm*—Oblon, Spivak, McClelland, Maier & Neustadt, P.C.

(57) ABSTRACT

An aqueous dispersion containing abrasive particles comprises abrasive particles having superparamagnetic metal oxide domains in a non-magnetic metal oxide or non-metal oxide matrix. The abrasive particles of the aqueous dispersion can have an average particle size of below 400 nm and a BET surface area of 50 to 600 m²/g. The dispersion can be produced by dispersing the abrasive particles with an energy of at least 200 kJ/m³ using a device in which the abrasive particles are first subjected to high pressure, then decompressed through a nozzle so that the abrasive particles collide with one another or against sections of wall in the device. The aqueous dispersion can be used for chemical mechanical polishing (CMP).

26 Claims, No Drawings

DISPERSION CONTAINING PYROGENICALLY MANUFACTURED ABRASIVE PARTICLES WITH SUPERPARAMAGNETIC DOMAINS

BACKGROUND OF THE INVENTION

1. Field of the Invention

The present invention is a novel dispersion containing abrasive particles, a method of preparing the dispersion, and methods of using the dispersion.

2. Discussion of the Background

The polishing dispersion plays a central role in the chemical mechanical polishing (CMP process) of oxide and metallic surfaces made from materials having very low dielectric constants, so-called "low-k" surfaces. These dispersions generally contain abrasive particles or mixtures of abrasive particles in addition to other constituents. With the growth of miniaturization in the electronics industry, the demands made on polishing dispersions are continuing to increase.

The use of magnetic dispersions in the CMP process for polishing "low-k" surfaces is described in U.S. Pat. No. 6,083,839. The polishing device has a number of magnetic coils, which can provide the same or different magnetic field strengths, and which may be arranged in spatially different positions. The distance from the magnetic coil to the surface to be polished can also be varied, thereby varying the force effect of the magnetic particles on the surface to be polished.

The disadvantage of the magnetic dispersion described in U.S. Pat. No. 6,083,839 is that it is made up of non-uniform particles, namely a physical mixture of silicon dioxide or cerium oxide and ferromagnetic particles, which have various particle sizes, differing hardnesses, and differing behaviour in an aqueous dispersion. The role of the silicon dioxide or cerium oxide should be that of an abrasive. The ferromagnetic particles, in conjunction with the magnetic coils, cause the particles to move. In practice, an exact separation of the particle properties is not possible. Thus, the ferromagnetic particles also display abrasive properties and tend to re-agglomerate and cause sedimentation in the dispersion. On the other hand, the magnetic effect is transferred only partially to the non-magnetic particles. For that reason U.S. Pat. No. 6,238,279 describes a method to remove magnetic particles, in this case iron oxide particles, before the CMP process is carried out.

A further disadvantage of U.S. Pat. No. 6,083,839 is that the force effect and the movement of the dispersion is substantially generated by the ferromagnetic particles and not by the abrasive particles, which are supposed to remove the surface to be polished. Thus, although the movement of the ferromagnetic particles also causes the abrasive particles to move in the dispersion, the abrasive particles do not experience pressure against the surface. This can lead to reduced or uneven removal of the surface during the polishing process.

In contrast to U.S. Pat. No. 6,083,839, the dispersion of the present invention contains uniform abrasive particles, which in a chemical mechanical polishing process lead to a uniform polishing result. The dispersion of the present invention further provides a substantially higher stability with regard to re-agglomeration and sedimentation than a dispersion containing ferromagnetic particles. Stability is understood to refer both to storage stability and to stability during the polishing process. The particles in the dispersion of the present invention that make up the magnetic and abrasive part of a particle further provide a uniform pressure on the surface to be polished under the application of a magnetic field. This leads to constant removal rates over the entire surface to be polished.

SUMMARY OF THE INVENTION

The object of the present invention is to provide a dispersion that avoids the disadvantages of the prior art.

In a first embodiment, the present invention is a dispersion comprising abrasive particles which are pyrogenically manufactured particles that have superparamagnetic metal oxide domains in a non-magnetic metal or non-metal oxide matrix.

The term "dispersion" means a fine dispersion of the abrasive particles in a medium comprising aqueous and/or organic phases as dispersant.

Pyrogenically manufactured particles are understood to be highly disperse particles that are obtained in the gas phase at elevated temperatures. This is described in more detail in Ullmann's Encyclopedia of Industrial Chemistry, Vol. A23, page 635 ff, $5^{th}$ edition with reference to silicon dioxide.

Domains are understood to be spatially separated superparamagnetic areas in and on the surface of the metal or non-metal oxide matrix. As a consequence of the pyrogenic manufacturing process, the abrasive particles are almost entirely pore-free and have free hydroxyl groups on the surface. These particles have superparamagnetic properties if an external magnetic field is applied. They are not permanently magnetized, however, and display only a low residual magnetization.

The term superparamagnetic refers to the property of materials whereby they have no permanent (equiaxed) alignment of the elementary magnetic dipoles in the absence of the action of external magnetic fields. In the presence of an external magnetic field, however, they have magnetic susceptibilities at a level similar to ferromagnetic materials. Superparamagnetism occurs when the diameter of the crystalline regions in a normally ferromagnetic substance falls below a particular critical value.

The relative amount of superparamagnetic domains in the particles may be between 1 and 99.6 wt. %. Regions of superparamagnetic domains that are spatially separated by the non-magnetic matrix lie within this range. Preferably, the relative amount of superparamagnetic domains is greater than 30 wt. %, particularly preferably greater than 50 wt. %. As the relative amount of superparamagnetic regions increases, the magnitude of the magnetic effect on the particles that can be achieved, also increases.

The superparamagnetic domains preferably comprise the oxides of Fe, Cr, Eu, Y, Sm or Gd, the superparamagnetic properties of which are already known. The metal oxides in these domains can have a uniform structure or various different structures.

In addition, the particles may also have non-magnetic regions. These non-magnetic regions can comprise mixed oxides of the non-magnetic matrix with the domains, for example, iron silicalite ($FeSiO_4$). These non-magnetic constituents behave in the same way as the non-magnetic matrix with regard to superparamagnetism. This means that the particles are superparamagnetic as before, but the saturation magnetization falls as the proportion of non-magnetic components increases.

A particularly preferred superparamagnetic domain is iron oxide in the form of gamma-$Fe_2O_3$ ($\gamma$-$Fe_2O_3$), $Fe_3O_4$, mixtures of gamma-$Fe_2O_3$ ($\gamma$-$Fe_2O_3$) and $Fe_3O_4$ and/or mixtures of the above with non-magnetic compounds containing iron.

The non-magnetic metal or non-metal oxide matrix can include the oxides of metals and non-metals of Si, Al, Ti, Ce, Mg, Zn, B, Zr or Ge. Silicon dioxide is particularly preferred. In addition to the spatial separation of the superparamagnetic domains, the matrix also has the property of stabilizing the level of oxidation of the superparamagnetic domain. Thus, for example, when the superparamagnetic iron oxide phase is magnetite, it may be stabilized by a silicon dioxide matrix.

The pyrogenically manufactured abrasive particles of the dispersion according to the present invention can be particles with superparamagnetic metal oxide domains having a diameter of 3 to 20 nm in a non-magnetic metal or non-metal oxide matrix.

The particles may have a chloride content of 50 to 1000 ppm and a carbon content of below 500 ppm, preferably below 100 ppm.

The particles of the present invention display varying degrees of aggregation, depending on the way in which the pyrogenic process is carried out. Process parameters affecting aggregation may include residence time, temperature, pressure, the partial pressures of the compounds used, and the type and location of cooling after the reaction. A broad spectrum of particle types of from largely spherical to largely aggregated particles can thus be obtained.

The particles of the present invention can be obtained by a pyrogenic process. For example, a compound containing the metal components of the superparamagnetic domain and a compound containing the metal or non-metal component of the non-magnetic matrix can be evaporated according to the ratio that is ultimately desired, mixed with air and/or oxygen and fuel gas and reacted in a burner. The reactants, precursors of the metal oxide or non-metal oxide matrix and the superparamagnetic domains, can both be of an inorganic or both of an organic nature, or can be a mixture of inorganic and organic compounds. The particles can also be modified by adsorption, surface reactions or complexation of or with inorganic and organic reagents.

The particles can, for example, have a partially or entirely hydrophobic surface by means of a subsequent treatment with surface modifying reagents. The particles may be prepared as described in DE-A-11 63 784, DE-A-196 16 781, DE-A-197 57 210 or DE-A-44 02 370, DE-A 198929845, DE-A 4202695, DE-A-4202694 for silicon dioxide, titanium dioxide and aluminum oxide. Each of the above-noted references is incorporated herein by reference, in their entirety.

The particles can further be partially or entirely coated with another metal or non-metal oxide. This can be achieved, for example, by dispersing the particles in a solution containing organometallic compounds. After addition of a hydrolyzing catalyst, the organometallic compound may be converted to its oxide, which is deposited onto the particles. Examples of such organometallic compounds are the alcoholates of silicon ($Si(OR)_4$), aluminum ($Al(OR)_3$) or titanium ($Ti(OR)_4$).

In a preferred embodiment, the particle size of the abrasive particles in the dispersion according to the present invention may be below 400 nm. The range of particle sizes is particularly preferably below 150 nm.

The particles dispersed in the dispersion according to the present invention can have a BET surface area of between 50 and 600 $m^2/g$.

The solids content of the dispersion according to the present invention is primarily governed by the intended use. In order to save transport costs, a dispersion having as high a solids content as possible may be desirable, whereas for certain applications, such as e.g. chemical mechanical polishing, dispersions having low solids contents are preferred. A solids content from 0.1 to 70 wt. %, relative to the total amount of dispersion, is preferred, and the range between 1 and 30 wt. % is particularly preferred. In this range the dispersion of to the present invention has good stability.

The dispersion can have a pH of between 3 and 12, preferably between 6 and 10.5. The pH can be adjusted using acids or bases, which serves to increase the stability of the dispersion. Both the isoelectric point of the abrasive particles and the stability of other substances present in the dispersion, for example the oxidizing agent, must be taken into account when adjusting the pH.

The acids may include inorganic acids, organic acids or mixtures thereof. Particularly preferred inorganic acids include phosphoric acid, phosphorous acid, nitric acid, hydrochloric acid, sulfuric acid, mixtures thereof, and their acid-reacting salts. Preferred organic acids include carboxylic acids having the general formula $C_nH_{2n+1}CO_2H$, where n=0–6 or n±8,10,12, 14,16, or dicarboxylic acids having the general formula $HO_2C(CH_2)_nCO_2H$, where n=0–4, or hydroxycarboxylic acids having the general formula $R_1R_2C(OH)CO_2H$, where $R_1$=H, $R_2$=$CH_3$, $CH_2CO_2H$, CH(OH)$CO_2H$, or phthalic acid or salicylic acid, or acid-reacting salts of the above acids or mixtures of the above acids and their salts.

The pH of the dispersion may be increased by the addition of ammonia, alkali hydroxides, amines or tetraalkyl ammonium hydroxides. Ammonia and potassium hydroxide are particularly preferred.

The dispersion according to the present invention can furthermore contain 0.3 to 20 wt. %, relative to the total amount of dispersion, of at least one oxidizing agent, which can be hydrogen peroxide, a hydrogen peroxide adduct, such as, for example the urea adduct, an organic per-acid, an inorganic per-acid, an imino per-acid, a persulfate, perborate, percarbonate, oxidizing metal salts and/or mixtures of the above. Hydrogen peroxide and adducts thereof are particularly preferred.

Due to the reduced stability of some oxidizing agents relative to other constituents of the dispersion of the present invention, the oxidizing agent may be added only immediately before the dispersion is used.

The dispersion of the present invention can further contain at least one oxidation activator, the purpose of which is to increase the rate of oxidation in chemical mechanical polishing. Suitable oxidation catalysts are metal salts of Ag, Co, Cr, Cu, Fe, Mo, Mn, Ni, Os, Pd, Ru, Sn, Ti, V and mixtures thereof. Carboxylic acids, nitrites, ureas, amides and esters are also suitable oxidation catalysts. The concentration of the oxidation catalyst can be varied within a range of between 0.001 and 2 wt. % relative to the total amount of dispersion, depending on the oxidizing agent and the polishing application. A range of between 0.01 and 0.05 wt. % is particularly preferred.

The dispersion of the present invention may further contain 0.001 to 2 wt. %, relative to the total amount of dispersion, of at least one corrosion inhibitor. Suitable inhibitors include the group of nitrogen-containing heterocyclic compounds, such as benzotriazole, substituted benzimidazoles, substituted pyrazines, substituted pyrazoles and mixtures thereof.

To further stabilize the dispersion, for example against settling of the abrasive, flocculation, and decomposition of the oxidizing agent, 0.001 to 10 wt. %, relative to the total amount of dispersion, of at least one surface-active substance, which may be non-ionic, cationic, anionic or amphoteric, may be added.

The dispersion of the present invention may also contain varying amounts of metal or non-metal oxides as an additional abrasive. In a particular embodiment, these additional abrasives can comprise oxides of silicon dioxide, aluminum oxide, titanium dioxide, zirconium oxide, cerium oxide and/or germanium oxide. Pyrogenically manufactured oxides and physical and chemical mixtures thereof are particularly preferred. Chemical mixtures are mixtures that result from mixing the precursors of the pyrogenic oxides before the pyrogenic reaction. Chemical mixtures of pyrogenic oxides also include doped oxides, such as those described, for example in DE 196 50 500, herein incorporated in its entirety by reference. The dispersion of the present invention may also contain magnetic metal particles, such as, for example, iron particles.

The present invention also provides a process for preparing the dispersion of the present invention by providing dispersing and/or grinding devices that provide an energy input of at least 200 KJ/m$^3$. These include systems operating according to the rotor-stator principle, for example Ultra-Turrax machines, or attrition mills. Higher energy inputs are possible with a planetary kneader/mixer. The efficiency of this system requires that the mixture to be processed has a sufficiently high viscosity in order to provide the high shear energies needed to disperse the particles.

Dispersions having particle sizes of below 150 nm can be obtained with high-pressure homogenizers. In these devices, two predispersed streams of suspension under high pressure are decompressed through a nozzle. The two jets of dispersion hit each other directly, and the particles grind themselves. In another embodiment the predispersion is again placed under high pressure, but the particles collide against armored sections of wall. The operation can be repeated any number of times to obtain smaller particle sizes.

In another embodiment, dielectric coatings such as silicon dioxide and nitride coatings, metal coatings, non-metal coatings and coatings made from materials having very low dielectric constants, so-called "low-k" materials, may be chemically mechanically polished with the dispersion of the present invention. These "low-k" materials, generally polymeric, organic materials, tend to deform, for example to bend out of shape, when subjected to chemical mechanical polishing. This can lead to the formation of non-uniform surfaces during polishing. These materials are also relatively soft, as a rule, which can lead to scratches during polishing. The dispersion of the present invention can successfully be used to polish "low-k" materials, particularly in combination with polishing devices in which the force effect of the abrasive particles on the surface to be polished is obtained, not with mechanical pressure, but by means of magnetic fields, as described for example in U.S. Pat. No. 6,083,839, herein incorporated by reference.

An oxidizing agent is generally used, to polish a metal surface. The abrasive particles of the dispersion of the present invention can also serve as an oxidation catalyst, and take over this function entirely or in part. In particular, acceleration of the oxidation can be provided when the superparamagnetic domain of the abrasive particles is iron oxide. By using a solid oxidation catalyst of a defined size, the problem described in U.S. Pat. No. 6,238,279, of oxidizing the soluble iron compounds conventionally used in CMP processes, such as iron(II) nitrate for example, in the presence of an oxidizing agent, can be avoided. The oxidation of soluble iron compounds leads to iron oxide aggregates and agglomerates of a non-uniform size.

The superparamagnetic nature of the abrasive particles of the dispersion of the present invention also allows them to be separated off from the contaminated dispersion, after the polishing process, by the application of an external magnetic field. Thus the abrasive particles of the dispersion of the present invention may be optionally reused or recovered.

Having generally described this invention, a further understanding can be obtained by reference to certain specific examples which are provided herein for purposes of illustration only, and are not intended to be limiting unless otherwise specified.

EXAMPLES

Analytical methods: The sizes of the dispersed particles, $d_{50}$, are determined using a Horiba LB-500 particle size analyzer.

Powder

The powders are produced according to the method of German application no. 10140089.6, filed Aug. 16, 2001, and herein incorporated by reference. 0.57 kg/h SiCl$_4$ was evaporated at approx. 200° C. and introduced into a mixing zone with 4.1 Nm$^3$/h hydrogen and 11 Nm$^3$/h air. An aerosol obtained from a 25 wt. % aqueous iron(III) chloride solution using a two-fluid nozzle was also introduced into the mixing zone by means of a carrier gas (3 Nm$^3$/h nitrogen). The homogeneously mixed gas-aerosol mixture flowed into the reactor, where it burned at an adiabatic combustion temperature of approximately 1400° C. and for a residence time of approximately 50 msec.

The adiabatic combustion temperature was calculated from the mass and energy balance of the streams of substances entering the reactor. The energy balance takes into account both the reaction enthalpy of the hydrogen combustion and the conversion of silicon tetrachloride to silicon dioxide and of iron(III) chloride to iron(II) oxide and the evaporation of the aqueous solution.

The residence time was calculated from the quotient of the volume of the unit through which the substances flowed and the working volumetric flow rate of the process gases at the adiabatic combustion temperature.

Following the flame hydrolysis, the reaction gases and the iron oxide-doped silicon dioxide powder P1 obtained were cooled by known means and the solid was separated from the waste gas stream using a filter. Residual hydrochloric acid still adhering to the powder was removed by treating the powder with water vapour-containing nitrogen.

Powder P2 and P2 were produced using the same procedure as for P1, above. The reaction parameters are provided in Table 1 and the analytical data for the powders P1 to P3 are provided in Table 2. 0.14 kg/h SiCl$_4$ was evaporated at approx. 200° C. and introduced into a mixing zone with 3.5 Nm$^3$/h hydrogen and 15 Nm$^3$/h air.

TABLE 1

Reaction Parameters for Powders P1 to P3

|  |  | P1 | P2 | P3 |
|---|---|---|---|---|
| SiCl$_4$ | kg/h | 0.57 | 0.57 | 0.23 |
| FeCl$_3$ | kg/h | 1.27 | 4.06 | 0.41 |
| Conc. FeCl$_3$ | wt. % | 25 | 10 | 10 |

TABLE 1-continued

Reaction Parameters for Powders P1 to P3

|  |  | P1 | P2 | P3 |
|---|---|---|---|---|
| Adiabatic temp. | ° C. | 1400 | 1010 | 1150 |
| Residence time(approx.) | Ms | 50 | 55 | 54 |

TABLE 2

Analytical Data for Powders P1 to P3

| Powder | Domain:<br>Domain | $SiO_2$<br>[wt. %] | BET<br>[m²/g] | Size<br>Maghemite<br>[nm] | Saturation<br>magnetisation<br>[Am²/kg] |
|---|---|---|---|---|---|
| P1 | maghemite/<br>magnetite | 50:50 | 52 | approx. 24 | 27.5 |
| P2 | maghemite/<br>magnetite | 50:50 | 120 | approx. 15 | 10 |
| P3 | maghemite/<br>magnetite | 20:80 | 174 | approx. 11 | 6.5 |

Dispersions

The following dispersion devices were used:

Dissolver: Type LR 34 with dispersing disk (40 mm), Fa. Pendraulik, Springe (Germany).

Ultra Turrax: T25 basic and dispersing tool S 25N-25G, Fa. IKA, Staufen (Germany).

Ultrasonic processor UP400 S, Dr. Hielscher, Stuttgart (Germany).

Dispersion D1: To 12.0 g of powder P1 in 108 g DI water (i.e., deionized water) was added sufficient 1M NaOH to provide a pH value of between 9.1 and 9.2. The mixture was dispersed using a dissolver for 5 min at 2000 rpm.

Dispersion D2: The same method was used as in the preparation of dispersion D1. However, after dispersing the mixture using a dissolver, the dispersion was then treated in an Ultraturrax for 5 min at 10,000 rpm.

Dispersion D3: The same method was used as in the preparation of dispersion D2. However, after dispersing the mixture using a dissolver and then an Ultraturrax, the dispersion was subjected to ultrasonic treatment for 4 min at an amplitude of 80%.

Dispersion D4 to D7: To 9.6 g of powder P1 and 110.4 g of DI water was added sufficient 1 M NaOH to provide a pH value of 7.8 for D4, 8.9 for D5, 9.8 for D6 and 10.7 for D7. Subsequently the mixtures were dispersed as described for D3.

Dispersion D8: 0.6 g of powder P2 and 119.4 g of DI water were dispersed as described for D1, without the addition of NaOH.

Dispersion D9: 0.6 g of powder P2 and 119.4 g of DI water were dispersed as described for D2, without the addition of NaOH.

Dispersion D10: 0.6 g of powder P2 and 119.4 g of DI water were dispersed as described for D3, without the addition of NaOH.

Dispersion D 11: 6 g of powder P2 and 114 g of DI water were dispersed as described for D1, without the addition of NaOH.

Dispersion D12: 6 g of powder P2 and 114 g of DI water were dispersed as described for D2, without the addition of NaOH.

Dispersion D13: 6 g of powder P2 and 114 g of DI water were dispersed as described for D3, without the addition of NaOH.

Dispersion D14: To 6 g of powder P3 and 114 g of DI water was added sufficient 1M NaOH to provide a pH value of 7.8. Subsequent the mixture was dispersed as described for D3.

Dispersion D15: To 12 g of powder P3 and 108 g of DI water was added sufficient 1M NaOH to provide a pH value of 8.8. Subsequently the mixture was dispersed as described for D3.

The data for the dispersions are provided in Table 3.

TABLE 3

Manufacture and Analytical Data of the Dispersions

| Dispersion | Powder | Method(*) | Powder<br>Conc.<br>[wt.-%] | pH | Particle Size<br>$d_{50}$(**)<br>[nm] |
|---|---|---|---|---|---|
| D1 | P1 | D | 10 | 9.1 | 310 |
| D2 | P1 | UT | 10 | 9.1 | 200 |
| D3 | P1 | US | 10 | 9.1 | 140 |
| D4 | P1 | US | 8 | 7.8 | 590 |
| D5 | P1 | US | 8 | 8.9 | 250 |
| D6 | P1 | US | 8 | 9.8 | 120 |
| D7 | P1 | US | 8 | 10.7 | 180 |
| D8 | P2 | D | 0.5 | ca. 3 | 1420 |
| D9 | P2 | UT | 0.5 | ca. 3 | 610 |
| D10 | P2 | US | 0.5 | ca. 3 | 380 |
| D11 | P2 | D | 5 | ca. 3 | 880 |
| D12 | P2 | UT | 5 | ca. 3 | 60 |
| D13 | P2 | US | 5 | ca. 3 | 110 |
| D14 | P3 | US | 5 | 7.8 | 590 |
| D15 | P3 | US | 10 | 8.8 | 180 |

(*)D: Dissolver; UT: Dissolver + Ultraturrax; US: Dissolver + Ultraturrax + Ultraschall
(**)determined 48 hours after the manufacture of the dispersions The priority document of the present application, German application 10153547.3, filed Oct. 30, 2001, is incorporated herein by reference.

Obviously, numerous modifications and variations on the present invention are possible in light of the above teachings. It is therefore to be understood that within the scope of the appended claims, the invention may be practiced otherwise than as specifically described herein.

What is claimed as new and is intended to be secured by Letters Patent is:

1. An aqueous dispersion comprising abrasive particles, wherein the abrasive particles comprise superparamagnetic metal oxide domains in a non-magnetic metal oxide or non-metal oxide matrix.

2. The aqueous dispersion of claim 1, wherein the abrasive particles have an average particle size of less than 400 nm.

3. The aqueous dispersion of claim 1, wherein the particles have a BET surface area of between 50 and 600 m²/g.

4. The aqueous dispersion of claim 1, wherein the aqueous dispersion has a solids content of between 0.1 and 70 wt. %, relative to the weight of the dispersion.

5. The aqueous dispersion of claim 1, wherein the aqueous dispersion has a pH of between 3 and 12.

6. The aqueous dispersion of claim 1, further comprising 0.3–20 wt. %; relative to the weight of the aqueous dispersion, of at least one oxidizing agent.

7. The aqueous dispersion of claim 1, further comprising between 0.001 and 2 wt. %, relative to the weight of the aqueous dispersion, of at least one oxidation activator.

8. The aqueous dispersion of claim 1, further comprising 0.001 to 2 wt. %, relative to the weight of the aqueous dispersion, of at least one corrosion inhibitor.

9. The aqueous dispersion of claim 1, further comprising 0.001 to 10 wt. %, relative to the weight of the aqueous dispersion, of at least one surface-active substance.

10. The aqueous dispersion of claim 1, further comprising at least one metal or non-metal oxide abrasive.

11. A process for preparing the aqueous dispersion of claim 1, wherein the abrasive particles are dispersed in water with an energy input of at least 200 KJ/m³.

12. The process of claim 11, wherein the abrasive particles are ground and dispersed by a device having a nozzle and at least one wall, whereby a mixture of the abrasive particles and water are subjected to pressure, then decompressed through a nozzle and so that the abrasive particles collide with one another or against a wall of the device.

13. A process comprising polishing a substrate with the aqueous dispersion of claim 1, then removing the abrasive particles from the substrate after said polishing.

14. The process of claim 13, wherein the substrate is selected from the group consisting of a dielectric coating, a metal coating, a non-metal coating, and a low-k coating.

15. The aqueous dispersion of claim 1, wherein the superparamagnetic metal oxide domains comprise oxides of Fe, Cr, Eu, Y, Sm, or Gd.

16. The aqueous dispersion of claim 1, wherein the superparamagnetic metal oxide domains comprise at least one metal oxide selected from the group consisting of $\gamma\text{-}Fe_2O_3$, $Fe_3O_4$, and mixtures thereof.

17. The aqueous dispersion of claim 1, wherein the matrix comprises $FeSiO_4$.

18. The aqueous dispersion of claim 1, wherein the abrasive particles have 1–99.6 wt. % of superparamagnetic metal oxide domains.

19. The aqueous dispersion of claim 1, wherein the abrasive particles are coated with another metal or non-metal oxide.

20. The aqueous dispersion of claim 1, wherein the abrasive particles are prepared by pyrogenic process.

21. An aqueous dispersion comprising abrasive particles, wherein the abrasive particles comprise superparamagnetic metal oxide domains in a non-magnetic metal oxide or non-metal oxide matrix, wherein the weight percent of the superparamagnetic oxide domains in the abrasive particles is 30–99.6%.

22. An aqueous dispersion of claim 21, wherein the weight percent is 50–99.6%.

23. An aqueous dispersion comprising abrasive particles, wherein the abrasive particles comprise superparamagnetic metal oxide domains in a non-magnetic metal oxide or non-metal oxide matrix, wherein the metal oxide or non-metal oxide is selected from the group consisting of oxides of Si, Ti, Ce, Mg, Zn, B, Zr and Ge.

24. The aqueous dispersion of claim 23, wherein the oxide is silicon dioxide.

25. An aqueous dispersion comprising abrasive particles, wherein the abrasive particles comprise superparamagnetic metal oxide domains in a non-magnetic metal oxide or non-metal oxide matrix, wherein said domains have a diameter of 3–20 nm.

26. The aqueous dispersion of claim 2, wherein the average particle size is less than 150 nm.

* * * * *